United States Patent
Kim et al.

(10) Patent No.: US 6,812,978 B2
(45) Date of Patent: Nov. 2, 2004

(54) METHOD FOR FABRICATING TRANSFLECTIVE COLOR LCD DEVICE AND THE TRANSFLECTIVE COLOR LCD DEVICE WITH THICK AND THIN REGIONS OF COLOR FILTER LAYER

(75) Inventors: Yong-Beom Kim, Suwon-shi (KR); Jeong-Hwan Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/793,983

(22) Filed: Feb. 28, 2001

(65) Prior Publication Data

US 2002/0003596 A1 Jan. 10, 2002

(Under 37 CFR 1.47)

(30) Foreign Application Priority Data

Feb. 29, 2000 (KR) .......................................... 2000-9979

(51) Int. Cl.[7] .............................................. G02F 1/1335
(52) U.S. Cl. ........................................................ 349/106
(58) Field of Search .................................. 349/107, 114, 349/106

(56) References Cited

U.S. PATENT DOCUMENTS

| | | | |
|---|---|---|---|
| 6,215,538 B1 | * | 4/2001 | Narutaki et al. ............. 349/106 |
| 6,259,500 B1 | * | 7/2001 | Kijima et al. ................ 349/113 |
| 6,281,952 B1 | * | 8/2001 | Okamoto et al. ............. 349/12 |
| 6,476,889 B2 | | 11/2002 | Urabe et al. |

* cited by examiner

*Primary Examiner*—James Dudek
*Assistant Examiner*—Timothy Rude
(74) *Attorney, Agent, or Firm*—McKenna Long & Aldridge LLP

(57) ABSTRACT

A color filter substrate includes a substrate, a plurality of buffer layers respectively on the substrate, the plurality of buffer layers being spaced apart from adjacent buffer layers with an interval such that they have the shape of a matrix, a plurality of color filter layers on the buffer layers such that the plurality of color filter layers have the shape of matrix, each color filter layer having first and second portions, the first portion disposed in the gap between two adjacent buffer layers while the second portion is disposed on upper surfaces of the two adjacent buffer layers, the plurality of color filter layers being used for the transflective LCD device; and a common electrode on the plurality of color filter layers. In fabricating the color filter layer, the first and second portions of the color filter layer are integrally formed. Therefore, a simple fabricating process is achieved.

22 Claims, 7 Drawing Sheets

METHOD FOR FABRICATING TRANSFLECTIVE COLOR LCD DEVICE AND THE TRANSFLECTIVE COLOR LCD DEVICE WITH THICK AND THIN REGIONS OF COLOR FILTER LAYER

BACKGROUND OF THE INVENTION

1. Field of the Invention

The present invention relates to a liquid crystal display device, and more particularly to a transflective liquid crystal display (LCD) device implementing a color filter having various thickness.

2. Discussion of the Related Art

LCD devices are usually classified into transmission type and reflection type according to their difference in a light source.

The transmission type LCD device uses light incident from a back light that is attached to a rear surface of a liquid crystal panel. The light is incident to a liquid crystal layer of the liquid crystal panel, and is absorbed or passes through the liquid crystal layer according to proper alignments of the liquid crystal layer. The alignment of the liquid crystal layer can be controlled by way of controlling an electric field, which is applied to the liquid crystal layer. Therefore, a transmittance ratio of the liquid crystal panel can be controlled by way of applying the electric field to the liquid crystal layer. Conventionally, the back light of the transmission type LCD device is an artificial light source. Therefore, high power consumption due to the back light is a greater disadvantage of the transmission type LCD device.

On the contrary to the above-mentioned transmission type LCD device, the reflection type LCD device uses an ambient light incident from a natural light source or an exterior artificial light source. Because of its low power consumption, the reflection type LCD device is focused on. However, the reflection type LCD device is useless when the whether or exterior light source is dark.

Accordingly, a transflective LCD device is developed to compensate for the reflective type LCD device. The transflective LCD device is useful regardless of the whether or exterior light source. FIG. 1 is an exploded perspective view illustrating a typical transflective LCD device.

The transflective LCD device 1 includes upper and lower substrates 10 and 20 that are opposed with each other, and an interposed liquid crystal layer 50 therebetween. The upper and lower substrates 10 and 20 are called a color filter substrate and an array substrate, respectively. In the upper substrate 10, on a surface opposing the lower substrate 20, black matrix 12 and color filter layer 14 that includes a plurality of red (R), green (G), and blue (B) color filters are formed. That is to say, the black matrix 12 surrounds each color filter, in shape of an array matrix. Further on the upper substrate 10, a common electrode 16 is formed to cover the color filter layer 14 and the black matrix 12.

In the lower substrate 20, on a surface opposing the upper substrate 10, a TFT "T" as a switching device is formed in shape of an array matrix corresponding to the color filter layer 14. In addition, a plurality of crossing gate and data lines 26 and 28 are positioned such that each TFT is located near each cross point of the gate and data lines 26 and 28. Further on the lower substrate 20, a plurality of reflective electrodes 22 are formed on an area defined by the gate and data lines 26 and 28. The area there defined is called a pixel region "P." Each reflective electrode 22 has a transmissive portion 22a thereon. The transmissive portion 22a beneficially has a shape of a through hole such that it exposes a transparent electrode 24 disposed below the reflective electrode 22. The reflective electrode 22 is beneficially made of a metal having a high reflectivity, and the transparent electrode 24 is beneficially made of a transparent conductive material, usually indium tin oxide (ITO) or indium zinc oxide (IZO).

FIG. 2 shows a cross-sectional view illustrating the transflective LCD device of FIG. 1. As shown, between the upper and lower substrates 10 and 20, a liquid crystal layer 50 is interposed. The upper substrate 10 has the color filter layer 14 and common electrode 16 on the inner surface opposing the lower substrate 20. On the common electrode 16, an upper alignment layer 142 is formed. In addition, on the exterior surface of the upper substrate 10, a retardation film or a half wave plate (HWP) 46 and an upper polarizer 54 are sequentially disposed. The half wave plate (HWP) 46 serves to involve a phase difference of "$\lambda/2$" for incident rays such that the incident rays rotate to have a phase difference of "$\lambda/2$" after passing through the half wave plate 46.

In the meanwhile, the lower substrate 20 has the reflective electrode 22 and transparent electrode 24 on its surface opposing the upper substrate 10. A lower alignment layer 44 is formed on the reflective electrode 22 and exposed portion of the transparent electrode 24. Between the reflective and transparent electrode 22 and 24, a passivation layer 48 is interposed to separate them. The reflective electrode 22 has the transmissive portion 22a, which exposes the transparent electrode 24. In addition, on the exterior surface of the lower substrate 20, a lower polarizer 52 is disposed, and below the lower polarizer 52, a back light 40 is disposed.

For forming the reflective and transparent electrode 22 and 24, at first, the transparent conductive material selected from indium tin oxide (ITO) or indium zinc oxide (IZO) is deposited on the lower substrate 20. The transparent conductive layer is patterned to form the transparent electrode 24. Then, an insulating material is deposited on the transparent electrode 24 to form the passivation layer 48. On the passivation layer 48, aluminum (Al) based metal of a high reflectivity is deposited and patterned such that the reflective electrode 22 is formed. At this point, portions of the reflective electrode 22 and passivation layer 48 are sequentially etched away to form the transmissive portion 22a.

The liquid crystal layer 50 between the upper and lower substrates 10 and 20 has an optical anisotropy. That is to say, in their first state alignment, long axes of the liquid crystal molecules are aligned parallel to the substrates 10 and 20. Whereas, with an electric field applied across the liquid crystal layer 50, the long axes of the molecules are aligned perpendicular to the substrates 10 and 20. Therefore, the liquid crystal layer 50 serves as a switch for incident rays of light. In the later state alignment, a homeotropic alignment, the rays pass through the liquid crystal layer 50, without a phase difference.

The liquid crystal layer 50 has a layer thickness or cell gap. Specifically, the liquid crystal layer 50 has a first cell gap "d1" over the reflective electrode 22 and a second cell gap "d2" over the transparent electrode 24. At this point, the first and second cell gaps "d1" and "d2" beneficially have a definite relationship. That is to say, the second cell gap d2 is beneficially twice as the first cell gap d1 (d2≈2d1). Over the reflective electrode 22, the liquid crystal layer 50 involves a phase difference of "$\lambda/4$." The above-mentioned different cell gaps "d1" and "d2" improve en efficiency of incident rays passing through the transmissive portion 22a.

More detailed explanation is followed with reference to relationships (1) and (2):

$$d1 \Delta n = \lambda/4 \quad (1),$$

$$d2 = 2d1 \quad (2),$$

such that $d2\Delta n = \lambda/2$, wherein "d1" is the first cell gap over the reflective electrode 22, "d2" is the second cell gap over the transmissive portion 22a or transparent electrode 24. The first relationship (1) about the phase difference "λ/4" means that rays get the phase difference of "λ/4" after passing through the liquid crystal layer 50 of the first cell gap "d1" over the reflective electrode 22. Similarly, the relationship "$d2\Delta n = \lambda/2$" means that the rays get the phase difference of "λ/2" after passing through the liquid crystal layer 50 of the second cell gap "d2" over the transmissive portion 22a.

Rays from the back light 40 pass through the lower polarizer 52 and are linearly polarized according to a first transmittance axis of the lower polarizer 52. That is to say, the lower polarizer 52 transmits only a portion of the incident rays that has a corresponding vibration direction parallel to the first transmittance axis of the lower polarizer 52. A vibration direction of rays is perpendicular to a travelling direction of the rays.

Then, the linearly polarized rays pass through the liquid crystal layer 50 over the transmissive portion 22a and get the phase difference of "λ/2", which is explained above. At this point, the liquid crystal molecules are aligned in the first state alignment without an electric field applied thereto. The phase difference "λ/2" makes the rays rotate such that they have a vibration direction perpendicular to the first transmittance axis of the lower polarizer 52. After passing through the liquid crystal layer 50, the rays subsequently pass through the half wave plate (HWP) 46 and get the additional phase difference of "λ/2", which means that the rays rotate to have a different vibration direction parallel to the first transmittance axis of the lower polarizer 52. At this point, the upper polarizer 54 has a second transmittance axis perpendicular to the first transmittance axis of the lower polarizer 52. Therefore, the rays passing through the half wave plate 46 are totally absorbed by the upper polarizer 54 such that a dark state for the transmissive portion 22a is achieved. Since the upper polarizer 54 absorbs all the rays, the dark state for the transmissive portion 22a is surely dark.

On the contrary, if the second cell gap d2 is equal to the first cell gap d1, rays passing through the liquid crystal layer 50 over the transmissive portion 22a get the phase difference of "λ/4" according to the first relationship (1), $d1\Delta n = d2\Delta n = \lambda/4$. That is to say, the rays are circularly polarized due to the phase difference "λ/4" of the liquid crystal layer 50. The circularly polarized rays subsequently pass through the half wave plate 46, and meet the upper polarizer 54. At this point, the circularly polarized rays include a parallel portion parallel to the second transmittance axis of the upper polarizer 54. Therefore, the parallel portion of the circularly polarized rays passes through the upper polarizer 54 such that the dark state has a gray level, which means that the dark state cannot be achieved.

Accordingly, the different cell gaps "d1" and "d2" are beneficially used for the clear dark state. With reference to FIGS. 3A, 3B, 4A, and 4B, operation modes for the typical transflective LCD device will be provided in more detail.

Phase changes of incident rays result from the operation of the upper and lower polarizers 54 and 52, liquid crystal layer 50, and half wave plate 46. Therefore, FIGS. 3A, 3B, 4A, and 4B refer to only the above-specified elements. In addition, as previously mentioned, the liquid crystal layer 50 has a homogeneous alignment at its first state alignment, and a homeotropic alignment with an electric field applied across the liquid crystal layer.

At first, FIG. 3A illustrates a dark state or mode for the transmissive portion 22a of FIG. 2. After rays of incident light from the back light 40 (see FIG. 2) pass through the lower polarizer 52, they are linearly polarized according to the first transmittance axis of the lower polarizer 52. At this point, the first transmittance axis has a direction of, for example, 45 degrees with respect to the long axis of the substrate 10 or 20 (see FIG. 1). Therefore, the linearly polarized rays passing through the lower polarizer 52 have the same vibration direction of 45 degrees as the first transmittance axis direction.

The linearly polarized rays subsequently pass through the liquid crystal layer 50 over the transmissive portion 22a. At this point, the liquid crystal layer 50 over the transmissive portion 22a is in the first state alignment with the second cell gap "d2." Therefore, the liquid crystal layer 50 over the transmissive portion 22a involves the phase difference of "λ/2" such that the linearly polarized rays rotate to be perpendicular to the first transmittance axis of the lower polarizer 52. Then, the half wave plate 46 additionally involves the same phase difference of "λ/2" such that the linearly polarized rays rotate to be parallel to the first transmittance axis of the lower polarizer 52. Finally, the upper polarizer 54, which has the second transmittance axis perpendicular to the first transmittance axis, absorbs all of the linearly polarized rays parallel to the first transmittance axis of the lower polarizer 52. Accordingly, the dark state of the transmissive portion 22a is achieved.

On the contrary with FIG. 3A, FIG. 3B illustrates a white state for the transmissive portion 22a of FIG. 2. At this point, the liquid crystal layer 50 has the homeotropic alignment with an electric field applied across the liquid crystal layer 50. Therefore, the liquid crystal layer 50 involves an optically isotropic property, and no phase difference occurs due to the liquid crystal layer 50.

Rays from the back light 40 are linearly polarized after passing through the lower polarizer 52. Then, the linearly polarized rays pass through the liquid crystal layer 50 without phase change, and meet the half wave plate 46. The half wave plate 46 involves the phase difference λ/2 such that the linearly polarized rays are parallel to the second transmittance axis of the upper polarizer 54. The second transmittance axis has a direction of 135 degrees, for example. Therefore, the upper polarizer 54 transmits all the rays such that the white state of the transmissive portion 22a is achieved.

FIG. 4A illustrates a dark state for the reflective electrode 22 of FIG. 2. At this point, the liquid crystal layer 50 involves the phase difference of "λ/4", and is aligned in the first state alignment, the homeotropic alignment with the second cell gap "d2." At first, the upper polarizer 54 linearly polarizes rays of incident light from an external light source such that they have the same vibration direction of 135 degrees as the second transmittance axis of the upper polarizer 54. Then, the first linearly polarized rays pass through the half wave plate 46. The half wave plate 46 rotates the vibration direction of the rays such that the first linearly polarized rays have a vibration direction of 45 degrees.

Subsequently, the rays pass through the liquid crystal layer 50 over the reflective electrode 22 of FIG. 2. The liquid crystal layer 50 circularly polarizes the rays with the phase difference "λ/4" such that the rays change as left-circularly polarized (LCP) rays. Then, the reflective electrode 22 (see FIG. 2) below the liquid crystal layer 50 reflects the LCP rays such that the LCP rays reverses its phase and travelling direction to be right-circularly polarized (RCP) rays.

Then, the liquid crystal layer 50 involving the phase difference "λ/4" changes the RCP rays to second linearly polarized rays having a vibration direction of 135 degrees, which is parallel to the second transmittance axis of the upper polarizer 54. The second linearly polarized rays subsequently pass through the half wave plate 46 and rotate to be perpendicular to the second transmittance axis of the upper polarizer 54. Since the upper polarizer 54 absorbs all the rays, the dark state of the reflective electrode 22 of FIG. 2 is achieved. As shown in FIGS. 3A and 4A, when the liquid crystal layer 50 is in the first state alignment without applied electric field, the conventional transflective LCD device of FIGS. 1 and 2 provides the dark state.

On the contrary to FIG. 4A, FIG. 4B illustrates a white state for the reflective electrode 22 of FIG. 2. At this point, the liquid crystal layer 50 is in the homeotropic alignment, which involves no phase difference. At first, the upper polarizer 54 linearly polarizes incident rays from an external light source. The first linearly polarized rays passing through the upper polarizer 54 has the same vibration direction of 135 degrees as the second transmittance axis of the upper polarizer 54. The first linearly polarized rays subsequently pass through the half wave plate 46. The half wave plate 46 rotates the vibration direction of the rays such that the first linearly polarized rays have a vibration direction of 45 degrees.

Then the rays pass through the liquid crystal layer 50 without phase difference and meet the reflective electrode 22 of FIG. 2. The reflective electrode 22 of FIG. 2 reflects the rays such the rays turn to have the vibration direction of 135 degrees, which is perpendicular to the second transmittance axis of the upper polarizer 54. Subsequently, the rays meet the half wave plate 46. The half wave plate 46 rotates the vibration direction of the rays such that the rays have a vibration direction of 45 degrees again. Therefore, the upper polarizer 54 transmits all the rays such that the white state of the reflective electrode 22 of FIG. 2 is achieved. As shown in FIGS. 3B and 4B, when the liquid crystal layer 50 is in the homeotropic alignment, the conventional transflective LCD device of FIGS. 1 and 2 provides the white state.

In another aspect, a color property should be considered in designing the transflective LCD device. Conventionally, the reflective electrode 22 of FIG. 5 implements a better color purity property than the transmissive portion 22a. As shown in FIG. 5, for a transmissive mode of the transflective LCD device 1, a first incident light "A" from the back light 40 only once passes through the color filter layer 14 having thickness "t1." However, for a reflective mode, a second incident light "B" from an exterior light source (not shown) twice passes through the color filter layer 14 having the same thickness "t1." That is to say, in the transmissive mode, the first incident light "A" is only once colored by the color filter layer 14. Whereas, in the reflective mode, the second incident light "B" is twice colored by the color filter layer 14. Therefore, regardless of the difference in luminance of the different light sources, the reflective mode of the reflective LCD device implements a better color purity property than the transmissive mode thereof.

To overcome the above-mentioned problem, a dual color filter layer having different thickness is conventionally adopted for the transflective LCD device. FIG. 6 shows a typical reflective LCD device having the above-mentioned dual color filter layer. As shown, the conventional dual color filter layer 30 has first and second portions 30a and 30b according to their thickness and location. Between the dual color filter layer 30 and common electrode 16, a planar layer 90 is interposed. Specifically, the first portion 30a is positioned over the transmissive portion 22a and has a second thickness "t2" while the second portion 30b is positioned over the reflective electrode 22 and has a third thickness "t3." The second thickness "t2" is beneficially greater than the third thickness "t3" such that an incident light from the back light 40 to the transmissive portion 22a takes more color purity in the transmissive mode. Consequently, the color purity property is uniform regardless of the different modes, the transmissive and reflective modes.

FIGS. 7A to 7D illustrate a fabricating process for the above-mentioned dual color filter layer 30. Generally, a typical color filter layer is formed on an upper substrate of a LCD device and includes red, green, and blue color resins "R", "G", and "B." In addition, the color filter layer usually includes a black matrix (BM) formed between the color resins to shield incident light.

At first as shown in FIG. 7A, on a transparent insulating substrate or upper substrate 10 (reference upper substrate 10 of FIG. 6), chromium oxide ($CrO_x$) and chromium (Cr) are sequentially deposited and patterned to form the black matrix 72. The black matrix 72 has a patterned shape corresponding to the color filter layers, which will be formed subsequently.

Since light can only be modulated at the area of the reflective electrode and transparent electrode 22 and 24 of FIG. 2, light passing through intervals between the reflective electrode and metal patterns (reference 28 and 26 of FIG. 1) degrade a display quality and should be eliminated. Therefore, the black matrix 72 is formed to cover the intervals. Further, the black matrix 72 shields an active area of a thin film transistor "T" (see FIG. 1) from light, unless electrical properties of the thin film transistor are deteriorated. For forming the black matrix 72, an assembly margin is considered.

Then, as shown in FIG. 7B, a red color resin is deposited and patterned on the substrate 10 to form the first red color filter layer 74. A photolithography process including an exposure step is used for forming the color filter layer. Since the color resin usually has a characteristic of a negative photoresist, non-exposed portions of the color resin are etched away. Then, green and blue color resins are sequentially deposited and patterned on the substrate 10 to respectively form the first green and blue color filter layers 76 and 78. Each of the first red, green, and blue color filter layer corresponds to one pixel region "P" shown in FIG. 1.

Thereafter, as shown in FIG. 7C, another red color resin is deposited and patterned on the first red color filter layer 74 such that a second red color filter layer 84 is formed. The photolithography process is also used for the second red color filter layer 84. At this point, the second red color filter layer 84 beneficially has the same area and location as the transmissive portion 22a shown in FIG. 6. Then, another green and blue color resins are sequentially deposited and patterned on the first green and blue color filter layers 76 and 78, respectively, such that second green and blue color filter layers 86 and 88 are formed.

Thereafter, as shown in FIG. 7D, a planar layer 90 is formed to cover the first and second color filter layers. The planar layer 90 is beneficially selected from an organic insulating material such as benzocyclobutene (BCB) and acryl resin, or an inorganic insulating material such as silicon dioxide ($SiO_2$) and silicon nitride ($SiN_x$). The planar layer 90 serves to compensate the stepped shape of the first and second color filter layers such that a leveled surface is provided for the substrate 10. On the planar layer 90, a transparent conductive material such as indium tin oxide (ITO) and indium zinc oxide (IZO) is deposited to form the common electrode 16.

As explained above, the conventional fabricating method for the dual color filter layer needs at least six photolithography processes. Too many photolithography processes cause high material cost and low yield to the above-mentioned conventional fabricating method.

SUMMARY OF THE INVENTION

Accordingly, the present invention is directed to a transflective LCD device that substantially obviates one or more of the problems due to limitations and disadvantages of the related art.

An object of the present invention is to provide a simple method for fabricating a transflective LCD device having a dual color filter layer.

In order to achieve the above object, in one aspect, the preferred embodiment of the present invention provides a color filter layer substrate used for a transflective LCD device. The color filter layer substrate includes: a substrate; a plurality of buffer layers respectively on the substrate, the plurality of buffer layers being spaced apart from adjacent buffer layers with an interval such that they have a shape of matrix; a plurality of color filter layers on the buffer layers such that the plurality of color filter layers have a shape of matrix, each color filter layer having first and second portions, the first portion disposed in the gap between two adjacent buffer layers while the second portion disposed on upper surfaces of the two adjacent buffer layers, the plurality of color filter layers being used for the transflective LCD device; and a common electrode on the plurality of color filter layers.

The first portion of the color filter layer is thicker than the second portion thereof such that a thickness ratio between the first and second portions is 1.1 to 2.5.

The color filter substrate further includes a plurality of black matrices on the substrate wherein each black matrix is spaced apart from adjacent black matrices.

The color filter layer substrate of claim 1, wherein the plurality of color filter layer includes red, green, and blue color resins.

The common electrode is selected from a group consisting of indium tin oxide (ITO) and indium zinc oxide (IZO).

In another aspect, the present invention provides a method for fabricating a color filter layer substrate. The method includes: forming a buffer layer on the substrate, the buffer layer having a plurality of through holes in shape of the array matrix; forming a plurality of color filter layers on the buffer layer, each color filter layer having first and second portions such that a through hole of the buffer layer receiving the first portion; and forming a common electrode on the plurality of color filter layers.

The method further includes a step of forming a black matrix on a substrate wherein the black matrix having an array matrix shape.

In another aspect the present invention provides a transflective liquid crystal display device, which includes: upper and lower substrates opposing each other; liquid crystal layer interposed between the upper and lower substrates; a transparent electrode on the lower substrate; a reflective electrode over the transparent electrode, the reflective electrode having a first through hole, the first through hole exposing the transparent electrode such that the liquid crystal layer facing both the transparent and reflective electrodes; a passivation layer between the reflective and transparent electrode, the first through hole of the reflective electrode passing through the passivation layer; a color filter layer between the upper substrate and liquid crystal layer, the color filter layer having first and second portions, the first portion corresponding to the first through hole of the reflective electrode; a buffer layer between the color filter layer and the upper substrate, the buffer layer having a second through hole, the through hole receiving the first portion of the color filter layer; upper and lower polarizers respectively on exterior surfaces of the upper and lower substrates; a retardation layer between the upper polarizer and upper substrate; and a back light under the lower polarizer.

The device further includes upper and lower alignment layers, the upper and lower alignment layers directly facing, respectively, upper and lower surfaces of the liquid crystal layer.

The first portion of the color filter layer is thicker than the second portion thereof such that a thickness ratio between the first and second portions is 1.1 to 2.5.

In the device, a first cell gap "d1" is measured between the reflective and common electrodes, a second cell gap "d2" is measured between the transparent and common electrodes, and a cell gap ratio "d2/d1" is 1.1 to 2.5.

The retardation layer is a half wave plate involving a phase difference of "$\lambda/2$", or the retardation layer is a quarter wave plate.

Another retardation layer is interposed between the lower substrate and lower polarizer.

The device further includes a black matrix surrounded by the buffer layer.

The passivation layer is transparent and insulating. The buffer layer is transparent and insulating.

The lower substrate includes a gate line, a data line, and thin film transistor.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, which are illustrated in the accompanying drawings.

Figure 8:
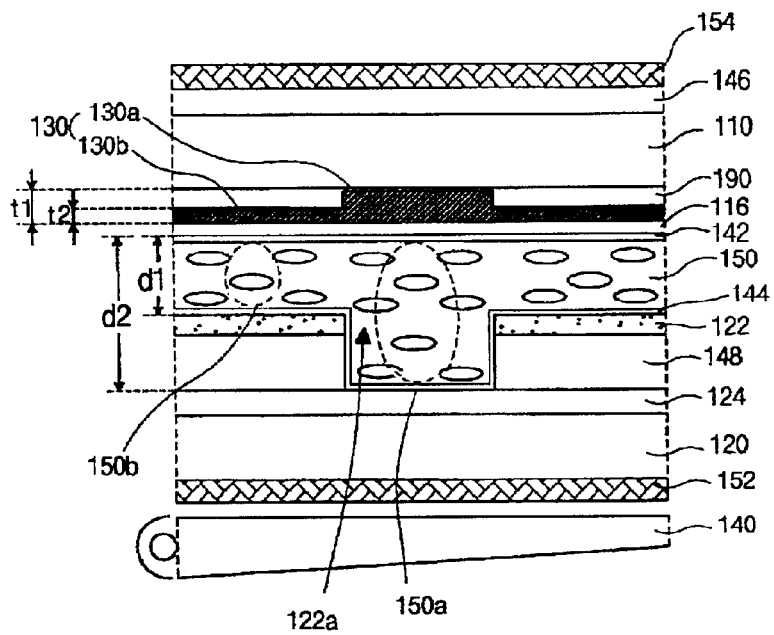
FIG. 8 is a cross-sectional view illustrating a transflective LCD device having a dual color filter layer according to a preferred embodiment of the present invention.

FIG. 8 is a cross-sectional view illustrating an LCD device according to the preferred embodiment of the present invention. As shown, between the upper and lower substrates 110 and 120, a liquid crystal layer 150 is interposed. The upper substrate 110 has the color filter layer 130 and common electrode 116, which are sequentially formed on the surface opposing the lower substrate 120. On a surface of the common electrode 116, an upper alignment layer 142 is formed to face the liquid crystal layer 150. Between the upper substrate 110 and the color filter layer 130, a buffer layer 190 is interposed. In addition, on the exterior surface of the upper substrate 110, a retardation film 146 and an upper polarizer 154 are sequentially disposed. Though a half wave plate (HWP) is used as the retardation layer 146 for the preferred embodiment, a quarter wave plate (QWP) may be used instead of the HWP. The half wave plate (HVWP) 46 preferably involves a phase difference of "λ/2." The phase difference is usually expressed as a product "dΔn", where "d" is a cell gap of a liquid crystal layer, and "Δn" is an anisotropy of refraction index for the liquid crystal.

Figure 1:
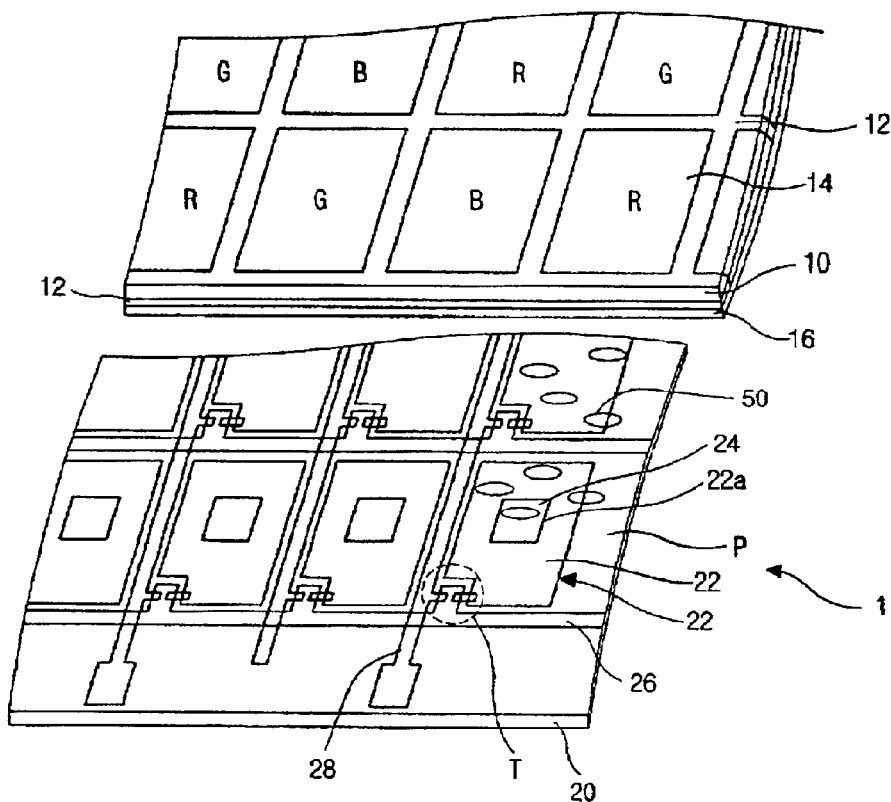
FIG. 1 is an exploded perspective view illustrating a typical transflective LCD device.
Figure 2:
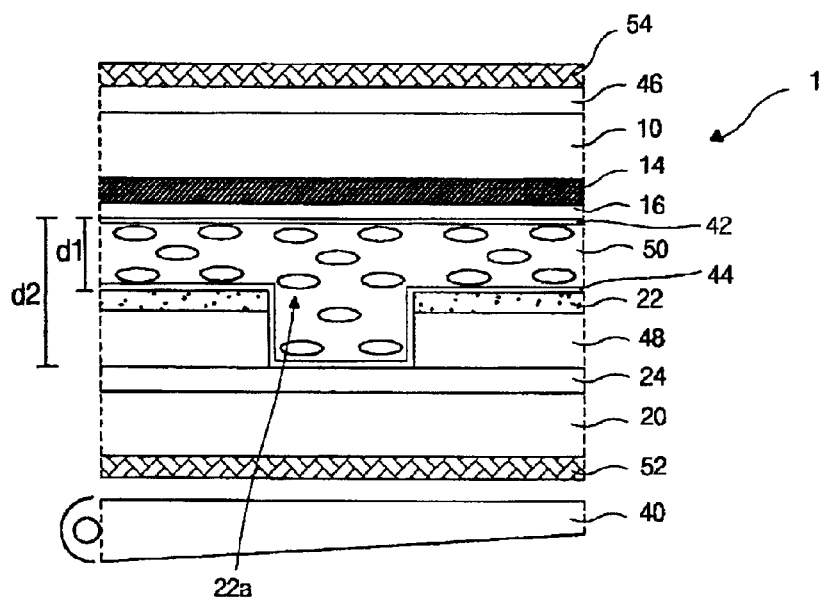
FIG. 2 is a cross-sectional view of the transflective LCD device shown in FIG. 1.
Figure 3A:
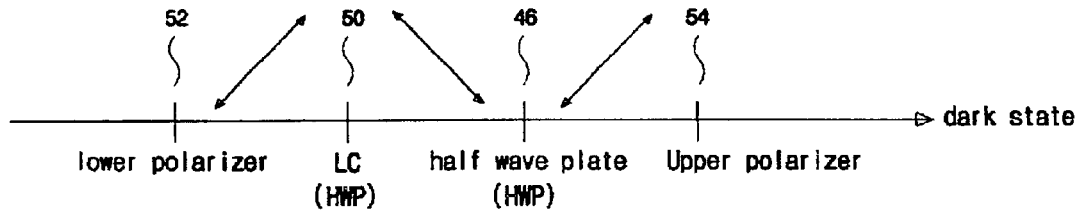
FIGS. 3A and 3B are flow diagrams illustrating a transmissive mode for the transflective LCD device.
Figure 3B:
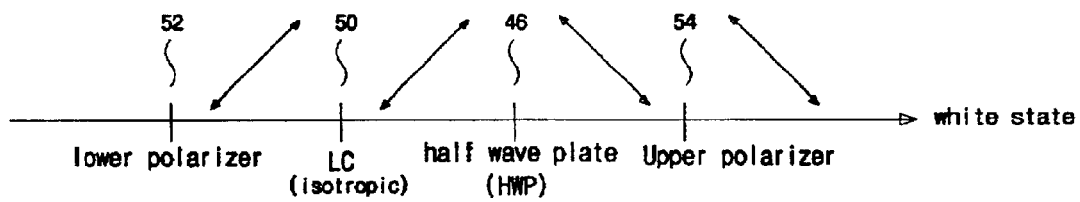
Figure 4A:
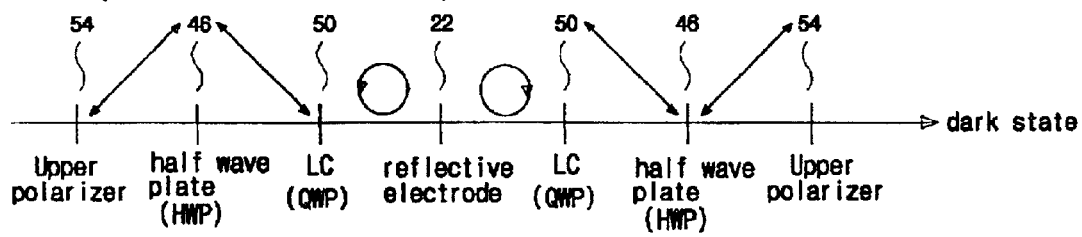
FIGS. 4A and 4B are flow diagrams illustrating a reflective mode for the transflective LCD device.
Figure 4B:
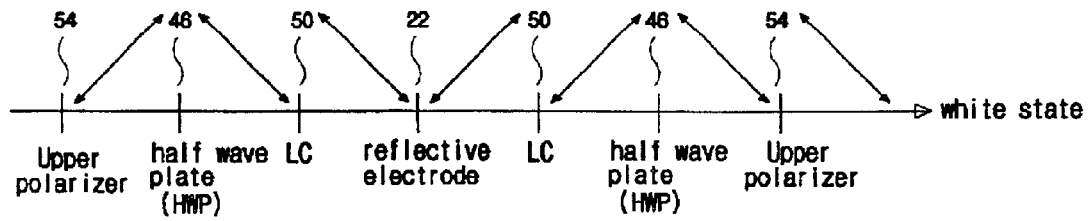
Figure 5:
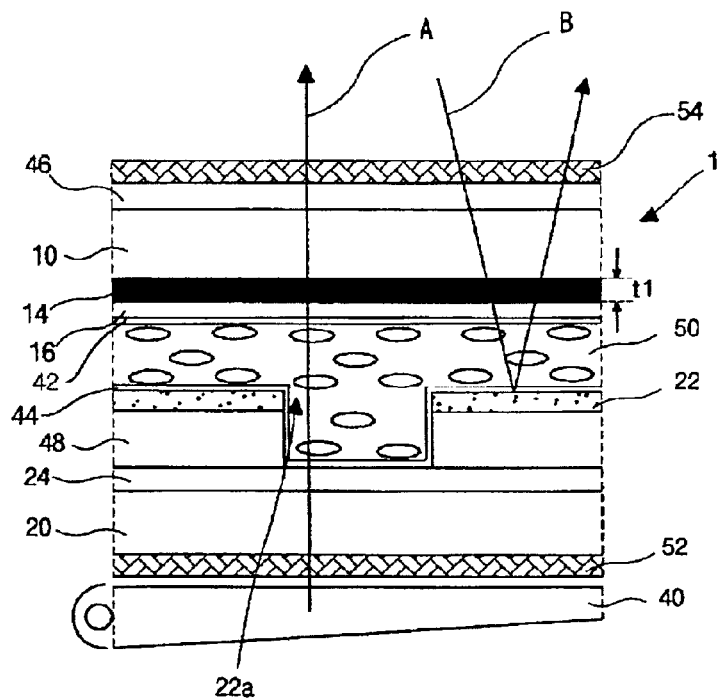
FIG. 5 is the same cross-sectional view as FIG. 2 and illustrates different passages for incident rays from a back light and an exterior light source.
Figure 6:
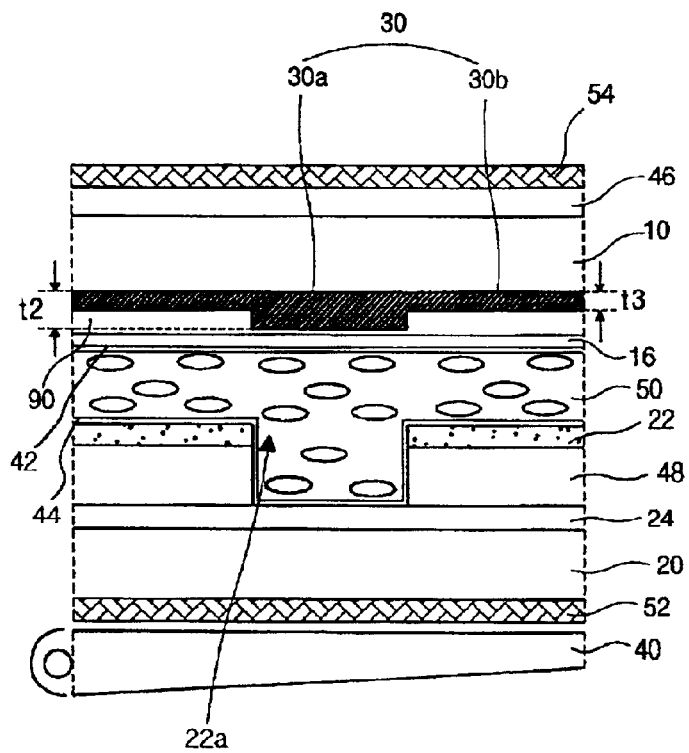
FIG. 6 is a cross-sectional view illustrating a transflective LCD device having a dual color filter layer according to the prior art.
Figure 7A:
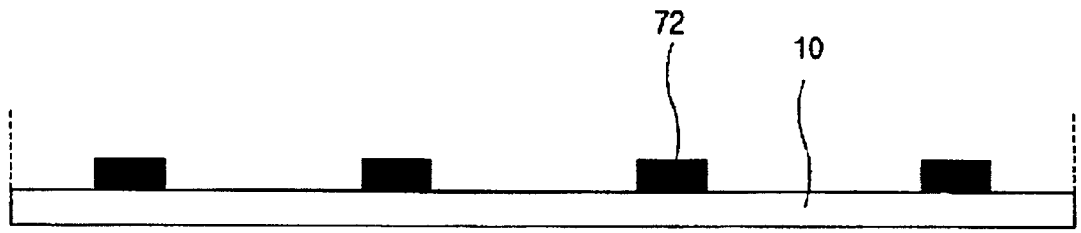
FIGS. 7A to 7D are sequential cross-sectional views illustrating a fabricating process for the conventional dual color filter layer.
Figure 7B:
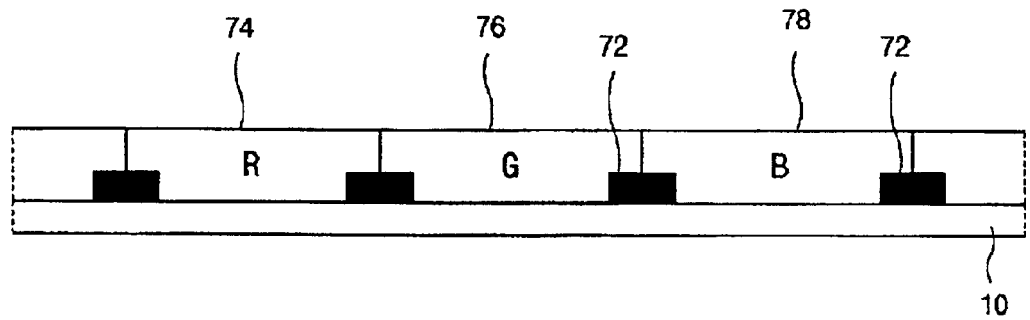
Figure 7C:
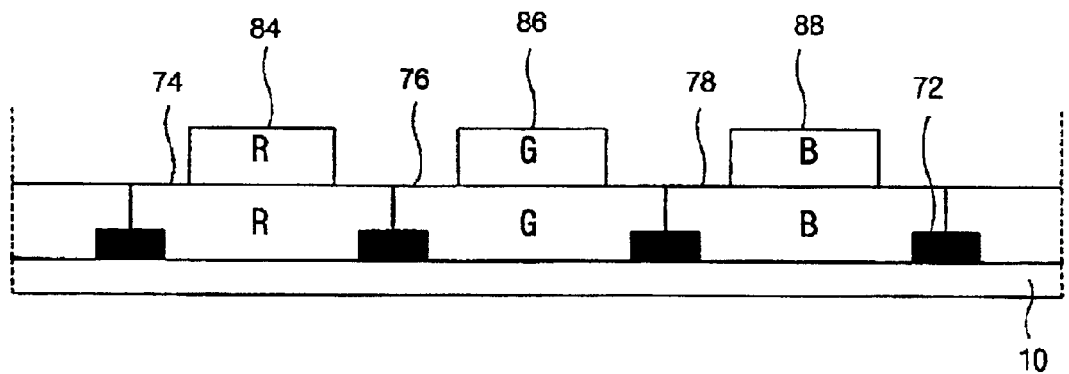
Figure 7D:
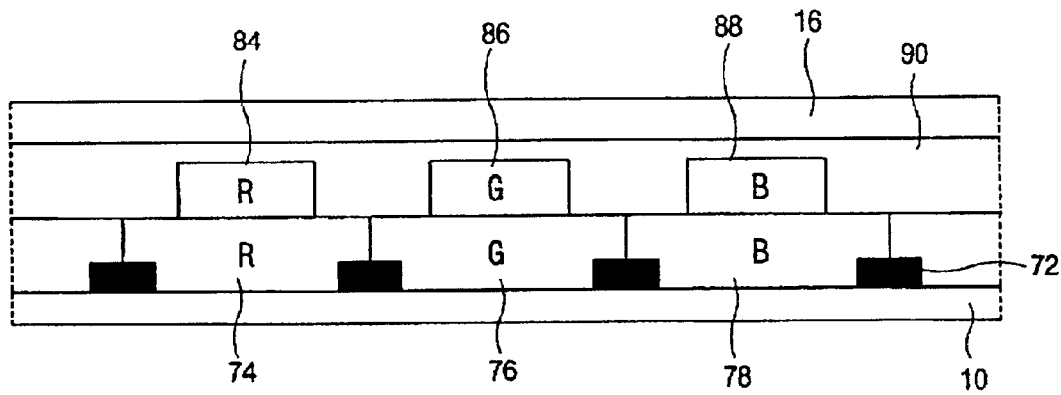

In the meanwhile, the lower substrate 120 has the reflective electrode 122 and transparent electrode 124 on its surface opposing the upper substrate 110. Between the reflective and transparent electrode 122 and 124, a passivation layer 148 is interposed to separate them. The reflective electrode 122 has the transmissive portion 122a, which exposes the transparent electrode 124. Preferably, the transmissive portion 122a is a through hole communicating with the passivation layer 148, and the passivation layer 148 has the same sized through hole such that the transmissive portion 122a exposes the transparent electrode 124. In addition, on the exterior surface of the lower substrate 120, a lower polarizer 152 is disposed, and below the lower polarizer 152, a back light 140 is disposed. A lower alignment layer 144 corresponding to the upper alignment layer 142 is formed on the reflective electrode 122 and exposed portion of the transparent electrode 124. Though not shown in FIG. 8, a gate line, a data line, and a thin film transistor (reference 26, 28, and "T" of FIG. 1) are formed in peripheries of the transparent and reflective electrodes 124 and 122. In addition, another retardation layer (not shown) may be disposed between the lower substrate 120 and lower polarizer 152.

The liquid crystal layer 150 has a layer thickness or cell gap. Specifically, a first liquid crystal portion 150b has a first cell gap "d1" over the reflective electrode 122, and a second liquid crystal portion 150b has a second cell gap "d2" over the transparent electrode 124. The first and second cell gaps "d1" and "d2" preferably have a relationship therebetween. That is to say, the second cell gap d2 is about twice the first cell gap d1 (d2 =2d1). Preferably, a cell gap ratio of "d2/d1" is 1.5 to 2.5. A thickness of the passivation layer 148 is preferably controlled to achieve the above-mentioned relationship between the first and second cell gaps "d1" and "d2."

The color filter layer 130 as a dual color filter layer has first and second portions 130a and 130b. The color filter layer 130 has a first thickness "t1", while the second portion 130b has a second thickness "t2." That is to say, the color filter layer 130 has a stepped portion, the first portion 130a, which is protruded from the second portion 130b. The first portion 130a corresponds to the transmissive portion 122a of the reflective electrode 122 such that the transmissive portion 122a involves the same color purity as the reflective electrode 122. The buffer layer 190 is interposed between the color filter layer 130 and the upper substrate 110 such that a desired thickness ratio "t1/t2" is achieved.

Several factors should be considered for fabricating the above-mentioned dual-color filter layer 130. For example, a difference in light sources used for the transparent electrode 124 and reflective electrode 122, and amount of dye included in the color filter layer 130. Considering the above-mentioned factors, the color filter layer 130 is designed to have a thickness ratio "t1/t2", which is over 1.0. Preferably, the thickness ratio "t1/t2" is 1.1 to 2.5 inclusive, and it may vary according to position and color of the color filter layer 130. That is to say, the dual color filter layer 130 preferably has the various thickness "t1/t2" according to its color, red, green, or blue.

Figure 9A:
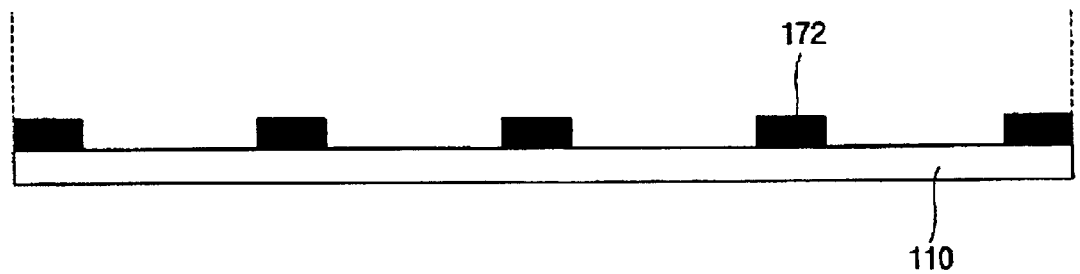
FIGS. 9A to 9F are sequential cross-sectional views illustrating a fabricating process for the inventive dual color filter layer.

Now, with reference to FIGS. 9A to 9F, a fabricating method for the color filter layer 130 according to the preferred embodiment is explained. At first as shown in FIG. 9A, on a transparent insulating substrate or upper substrate 110 (reference upper substrate 110 of FIG. 8), chromium oxide (CrO$_x$) and chromium (Cr) are sequentially deposited and patterned to form the black matrix 172. The black matrix 172 has a patterned shape corresponding to the color filter layers, which will be formed subsequently.

Figure 9B:
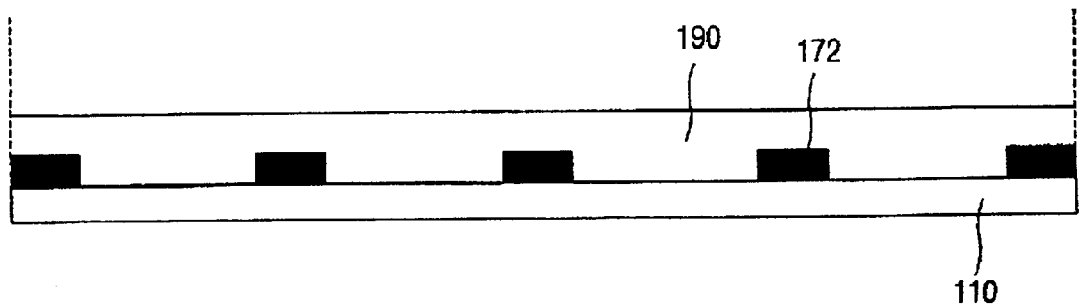
Figure 9C:
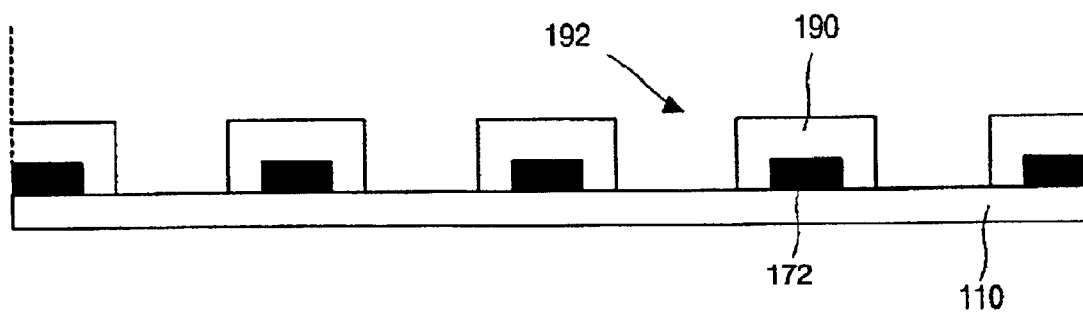

Then, as shown in FIG. 9B, a photo-polymerization polymer or organic insulating material is deposited on the upper substrate 110 to form the buffer layer 190, which is transparent. Thereafter, as shown in FIG. 9C, the buffer layer 190 is patterned using a photolithography process such that a plurality of through holes 192 is formed. The through hole 192 corresponds to the transmissive portion 122a of FIG. 8. That is to say, the through hole 192 has the same size and position as the transmissive portion 122a of FIG. 8.

Figure 9D:
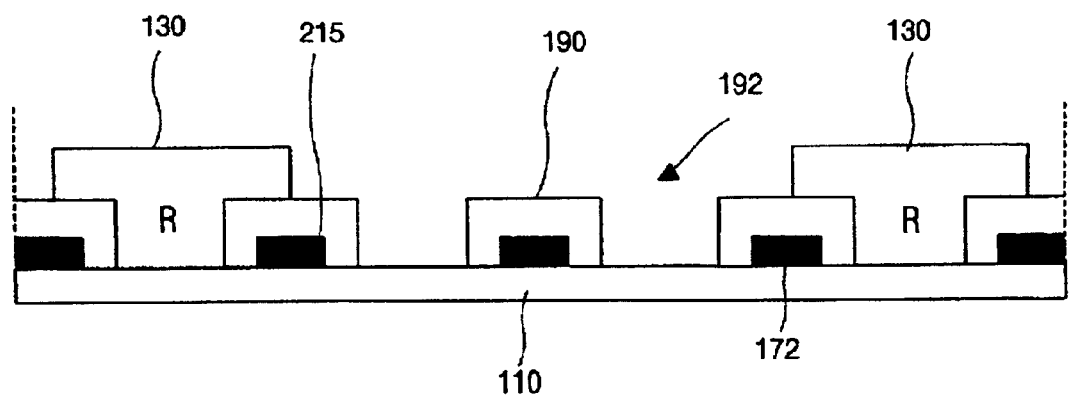

Thereafter, as shown in FIG. 9D, a red color resin including a red dye is deposited and patterned on the buffer layer 190 to form red color filter layers 130. For the sake of convenience, the color filter layer 130 of FIG. 8 is now defined as the red color filter. Due to the buffer layer 190, the red color filter layer 130 has a stepped shape. As previously explained, the thickness ratio "t1/t2" the red color filter layer 130 is preferably 1.1 to 2.5.

Figure 9E:
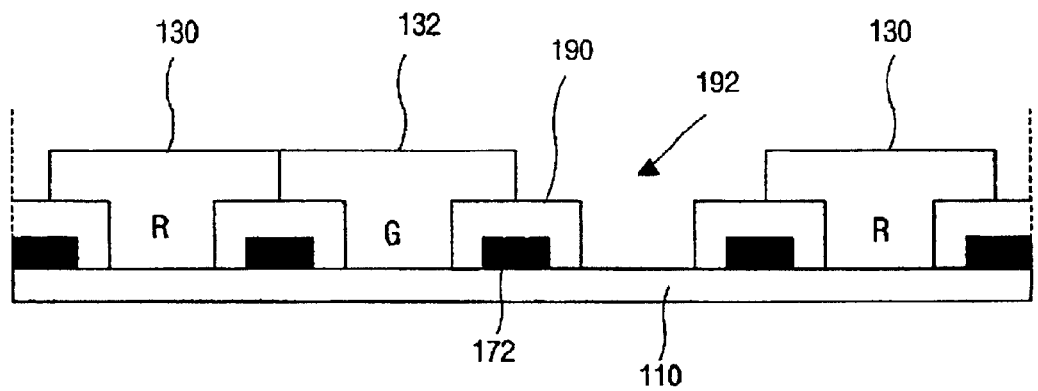
Figure 9F:
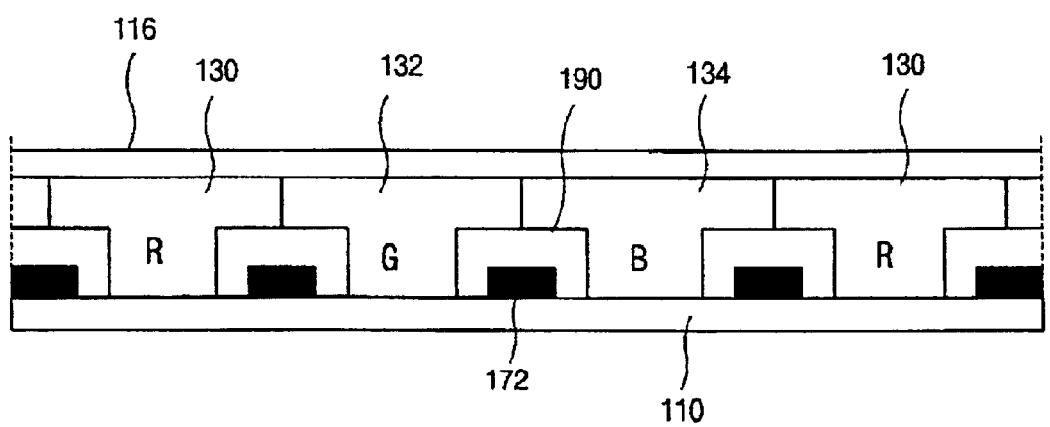

Thereafter, as shown in FIG. 9E, a green color resin including a green dye is deposited and patterned to form green color filter layers 132. Subsequently in FIG. 9F, a blue color resin including a blue dye is subsequently deposited and patterned to form blue color filter layers 134. Then, a transparent conductive material selected from a group consisting of indium tin oxide (ITO) or indium zinc oxide (IZO) is deposited on the red, green, and blue color filter layers 130, 132, and 134 such that the common electrode 116 is formed. Though the black matrix 172 of FIGS. 9A to 9E is employed for the preferred embodiment, it may be excluded for modifications of the preferred embodiment.

Figure 10:
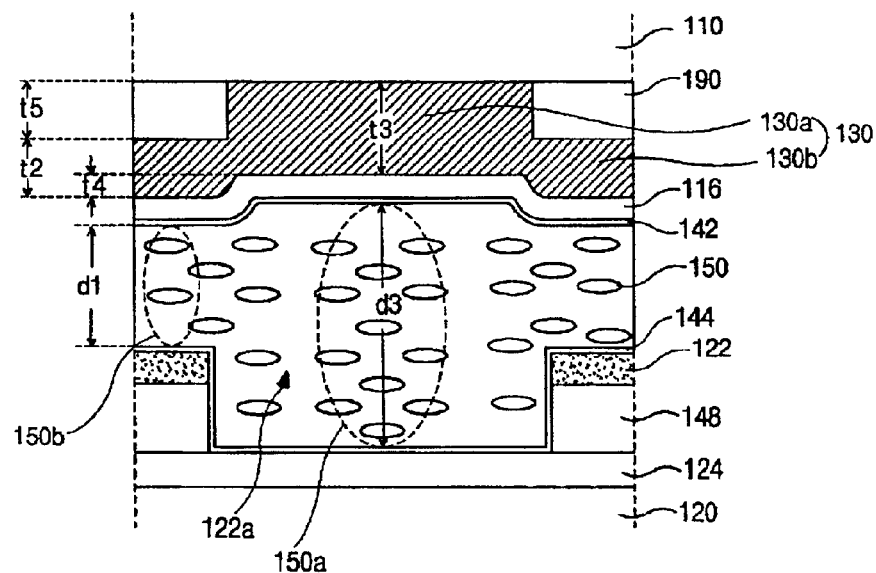
FIG. 10 is a partially expanded view of FIG. 8.

FIG. 10 is a partially expanded view of FIG. 8. As shown, the first portion 130a of the color filter layer 130 is shrunken in a direction opposite to the transmissive portion 122a. That is to say, when the color filter layer 130 is formed on the upper substrate 110 including the buffer layer 190, portions of the color filter layer 130 are shrunken toward the upper substrate 110 due to a stepped surface of the upper substrate 110. Therefore, The first portion 130a of the color filter layer 130 has a third thickness "t3", which is smaller than the first thickness "t1" shown in FIG. 8 by a fourth thickness or shrinking depth "t4." Relationships between the first to fifth thickness is expressed as:

$$t2+t5=t3+t4 \quad (1)$$

$$t1=t3+t4 \quad (2),$$

wherein a fifth thickness "t5" is a thickness of the buffer layer 190.

A thickness ratio "t3/t2" is preferably 1.1 to 2.5 such that the first and second portions 130a and 130b improve color properties, which is explained previously. Then, the third thickness "t3" of the first portion is preferably larger than the first thickness "t2" such that t3>t2 or t3−t2>0. Then, a relationship between the fourth and fifth thickness "t4" and "t5" is induced as follows:

$$t3-t2=t5-t4>0, \text{ from the relationship} \quad (1),$$

therefore, t5>t4.

That is to say, the buffer layer 190 preferably has a greater thickness than the shrinking thickness of the first portion 130a.

Still referring to FIG. 10, because of the shrinking thickness "t4", the first liquid crystal portion 150a has a new cell gap, a third cell gap "d3", which is greater than the first cell gap "d1" shown in FIG. 8. For the same reason explained previously, the third cell gap "d3" is about twice the second cell gap "d1" of the second liquid crystal portion 150b. Preferably, a cell gap ratio "d3/d1" is 1.5 to 2.5.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device comprising:
   upper and lower substrates opposing each other,
   a liquid crystal layer interposed between the upper and lower substrates;
   a transparent electrode on the lower substrate;
   a reflective electrode over the transparent electrode, the reflective electrode having a
   first through hole, the first through hole exposing the transparent electrode such that the liquid crystal layer faces both the transparent and reflective electrodes;
   a passivation layer between the reflective and transparent electrode, the first through hole of the reflective electrode passing through the passivation layer;
   a color filter layer between the upper substrate and liquid crystal layer, the color filter layer having first and second portions, the first portion corresponding to the first through hole of the reflective electrode;
   a buffer layer between the color filter layer and the upper substrate, the buffer layer having a second through hole, the second through hole receiving the first portion of the color filter layer,
   upper and lower polarizers respectively on exterior surfaces of the upper and lower substrates respectively
   a retardation layer between the upper polarizer and upper substrate; and
   a back light under the lower polarizer.

2. The device of claim 1, further comprising upper and lower alignment layers, the upper and lower alignment layers directly facing, respectively, upper and lower surfaces of the liquid crystal layer.

3. The device of claim 1, wherein t1>t2 and the ratio t1/t2 ranges from 1.1 to 2.5.

4. The device of claim 1, wherein a first cell gap "d1" is measured between the reflective and common electrodes, a second cell gap "d2" is measured between the transparent and common electrodes, and a cell gap ratio "d2/d1" is in a range from 1.1 to 2.5.

5. The device of claim 1, wherein the retardation layer is a half wave plate involving a phase difference of $\lambda/2$.

6. The device of claim 1, wherein the retardation layer is a quarter wave plate.

7. The device of claim 1, wherein another retardation layer is interposed between the lower substrate and lower polarizer.

8. The device of claim 1, further comprising a black matrix surrounded by the buffer layer.

9. The device of claim 1, wherein the passivation layer is transparent and insulating.

10. The device of claim 1, wherein the buffer layer is transparent and insulating.

11. The device of claim 1, wherein the lower substrate includes a gate line, a data line, and a thin film transistor.

12. An apparatus for single pass recycling of waste water, comprising:
   a. a container for receiving waste water;
   b. a means for filtering lint and/or other similar size particles;
   c. a multimedia pressure filter comprising at least one tank, each tank containing a plurality of earth media, each media being sized to filter suspended solids of a particular size range;
   d. an activated carbon filter;
   e. a means for coagulating particles wherein said coagulating means comprises a combination of a polymer coagulant and ozone; and,
   f. a means for disinfecting said water
   whereby waste water passing through or in contact with at least one of said elements b–f is cleaned.

13. The device of claim 12, further comprising upper and lower alignment layers, the upper and lower alignment layers directly facing, respectively, upper and lower surfaces of the liquid crystal layer.

14. The device of claim 12, wherein the first portion of the color filter layer is thicker than the second portion thereof such that a thickness ratio between the first and second portions is in a range from 1.1 to 2.5.

15. The device of claim 12, wherein a first cell gap "d1" is measured between the reflective and common electrodes, a second cell gap "d2" is measured between the transparent and common electrodes, and a cell gap ratio "d2/d1" is in a range from 1.1 to 2.5.

16. The device of claim 12, wherein the retardation layer is a half wave plate involving a phase difference of $\lambda/2$.

17. The device of claim 12, wherein the retardation layer is a quarter wave plate.

18. The device of claim 12, wherein another retardation layer is interposed between the lower substrate and lower polarizer.

19. The device of claim 12, further comprising a black matrix surrounded by the buffer layer.

20. The device of claim 12, wherein the passivation layer is transparent and insulating.

21. The device of claim 12, wherein the buffer layer is transparent and insulating.

22. The device of claim 12, wherein the lower substrate includes a gate line, a data line, and a thin film transistor.

* * * * *

UNITED STATES PATENT AND TRADEMARK OFFICE
CERTIFICATE OF CORRECTION

PATENT NO. : 6,812,978 B2
DATED : November 2, 2004
INVENTOR(S) : Kim et al.

It is certified that error appears in the above-identified patent and that said Letters Patent is hereby corrected as shown below:

Column 12,
Lines 23-38, please replace Claim 12 with the following:

-- 12. A transflective liquid crystal display device comprising:
    upper and lower substrates opposing each other;
    a liquid crystal layer interposed between the upper and lower substrates;
    a transparent electrode on the lower substrate;
    a reflective electrode over the transparent electrode, the reflective electrode having a first through hole, the first through hole exposing the transparent electrode such that the liquid crystal layer faces both the transparent and reflective electrodes;
    a passivation layer between the reflective and transparent electrode, the first through hole of the reflective electrode passing through the passivation layer;
    a color filter layer between the upper substrate and liquid crystal layer, the color filter layer having first and second portions, the first portion corresponding to the first through hole of the reflective electrode;
    a buffer layer between the color filter layer and the upper substrate, the buffer layer having a second through hole, the second through hole receiving the first portion of the color filter layer;
    upper and lower polarizers respectively on exterior surfaces of the upper and lower substrates respectively;
    a retardation layer between the upper polarizer and upper substrate; and
    a back light under the lower polarizer. --

Signed and Sealed this

Twenty-fourth Day of May, 2005

JON W. DUDAS
*Director of the United States Patent and Trademark Office*